US012306491B2

(12) United States Patent
Ichihara et al.

(10) Patent No.: US 12,306,491 B2
(45) Date of Patent: May 20, 2025

(54) DISPLAY DEVICE

(71) Applicant: Japan Display Inc., Tokyo (JP)

(72) Inventors: Kazuki Ichihara, Tokyo (JP); Naoyuki Asano, Tokyo (JP)

(73) Assignee: Japan Display Inc., Tokyo (JP)

( * ) Notice: Subject to any disclaimer, the term of this patent is extended or adjusted under 35 U.S.C. 154(b) by 272 days.

(21) Appl. No.: 17/664,075

(22) Filed: May 19, 2022

(65) Prior Publication Data

US 2022/0390792 A1 Dec. 8, 2022

(30) Foreign Application Priority Data

Jun. 4, 2021 (JP) ................................. 2021-094380

(51) Int. Cl.
*G02F 1/1333* (2006.01)
*G02F 1/1334* (2006.01)

(52) U.S. Cl.
CPC ...... *G02F 1/133385* (2013.01); *G02F 1/1334* (2013.01); *G02F 2202/28* (2013.01)

(58) Field of Classification Search
CPC ............ G02F 1/133385; G02F 1/1334; G02F 2202/28; G02F 1/133302; G02F 1/133615
See application file for complete search history.

(56) References Cited

U.S. PATENT DOCUMENTS

| | | | |
|---|---|---|---|
| 2012/0206680 A1* | 8/2012 | Onishi | G02F 1/136204 |
| | | | 349/122 |
| 2019/0324305 A1* | 10/2019 | Numata | G02F 1/133512 |
| 2020/0196492 A1* | 6/2020 | Kim | G02F 1/133385 |
| 2021/0167266 A1* | 6/2021 | Ikeda | H01L 33/62 |

FOREIGN PATENT DOCUMENTS

| | | |
|---|---|---|
| JP | H1184355 A | 3/1999 |
| JP | 2002229054 A | 8/2002 |
| JP | 2003309237 A | 10/2003 |
| JP | 2004309774 A | 11/2004 |
| JP | 2018136410 A | 8/2018 |
| JP | 2021-33043 A | 3/2021 |
| WO | WO-2020017303 A1 * | 1/2020 ........... H01L 25/167 |

OTHER PUBLICATIONS

Office Action issued on Sep. 17, 2024, in corresponding Japanese Application No. 2021-094380, 14 pages.

* cited by examiner

*Primary Examiner* — Edmond C Lau
*Assistant Examiner* — Agnes Dobrowolski
(74) *Attorney, Agent, or Firm* — Maier & Maier, PLLC

(57) ABSTRACT

According to one embodiment, a display device includes a first substrate having a first surface, a second surface on a side opposite to the first surface, and a first side surface which connects the first surface with the second surface, a second substrate having a second side surface and opposed to the first surface, an IC chip mounted on the first substrate, and a first heat radiation layer which is in contact with the second surface to radiate heat generated from the IC chip. The first substrate includes an extending portion which extends further than the second side surface, the IC chip is located on the first surface at the extending portion, and the first heat radiation layer overlaps the IC chip.

7 Claims, 6 Drawing Sheets

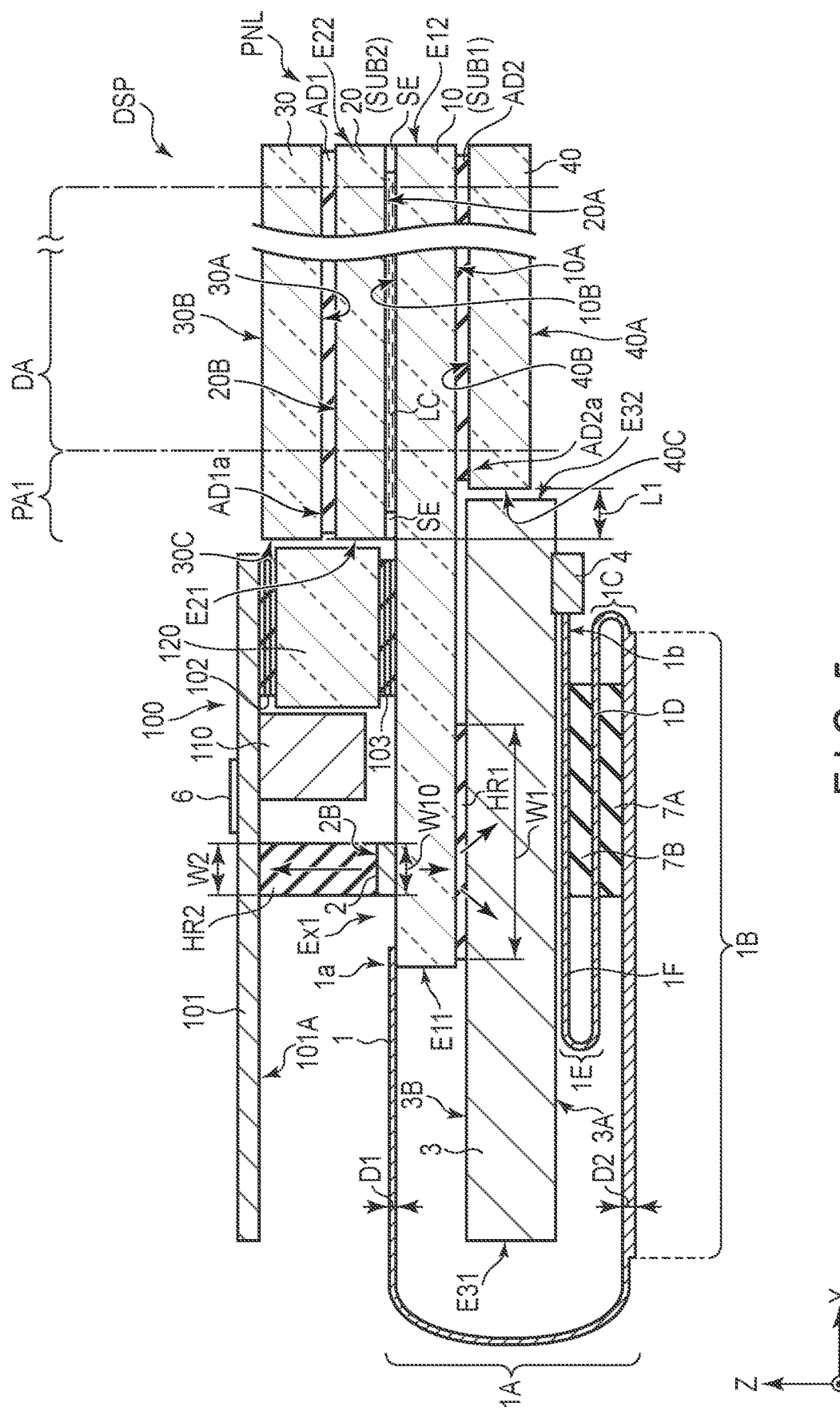
F I G. 5

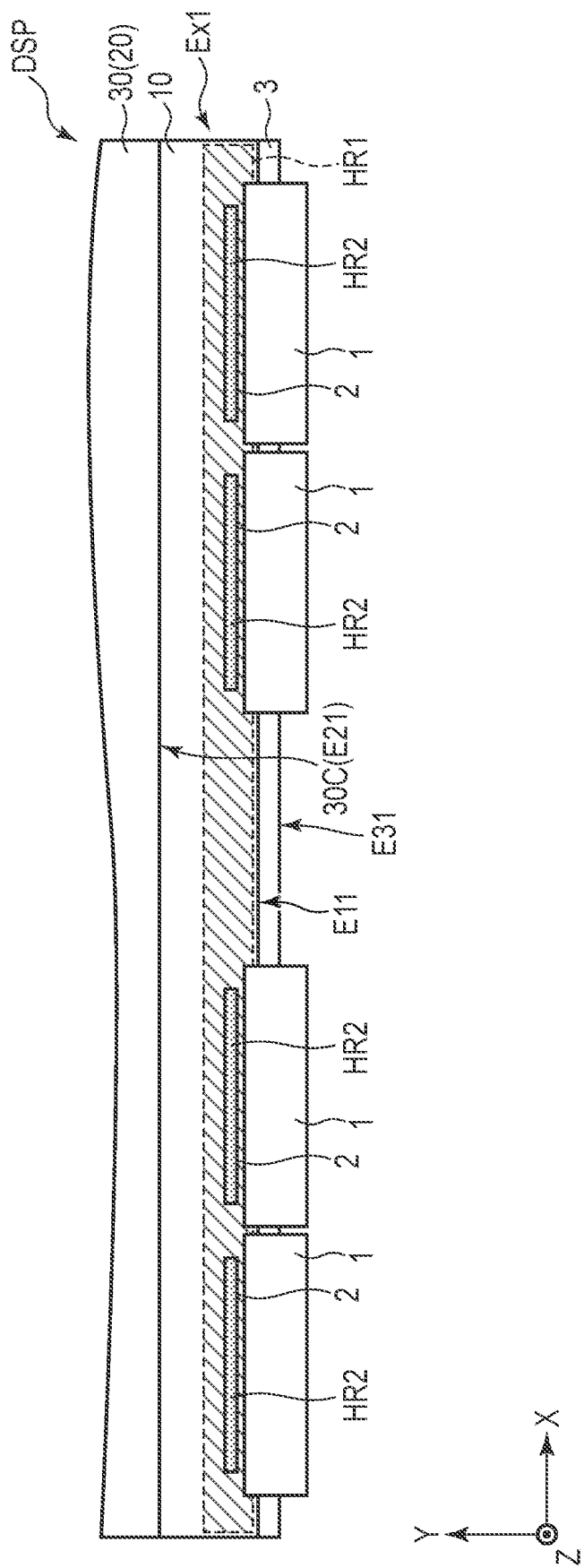
F I G. 6

DISPLAY DEVICE

CROSS-REFERENCE TO RELATED APPLICATIONS

This application is based upon and claims the benefit of priority from Japanese Patent Application No. 2021-094380, filed Jun. 4, 2021, the entire contents of which are incorporated herein by reference.

FIELD

Embodiments described herein relate generally to a display device.

BACKGROUND

In recent years, liquid crystal display devices, organic EL display devices and the like have come into widespread use as display devices off electronic devices. Each of these display devices comprises, for example, a display panel having a display area, and one or more IC chips mounted on the display panel outside the display area. The IC chip drives, for example, a large number of pixels included in the display area.

In addition, a display device comprising a display panel including a polymer dispersed liquid crystal layer (PDLC) has been proposed. The polymer dispersed liquid crystal layer can switch a scattering state in which light is scattered and a transmitted state in which light is transmitted. The display device can display images by switching the display panel to the scattering state. In contrast, the user can visually recognize a background through the display panel by switching the display panel to the transmitted state.

When the display device is driven, heat is generated in the IC chip by an influence such as a current flowing to the IC chip. If the temperature of the IC chip radically rises, problems may occur that the IC chip may be broken or the IC chip cannot sufficiently exert its performance.

BRIEF DESCRIPTION OF THE DRAWINGS

FIG. 5 is a cross-sectional view showing a configuration example of the display device according to the embodiment.

FIG. 6 is a plan view showing parts of the display device shown in FIG. 5.

DETAILED DESCRIPTION

Figure 1:
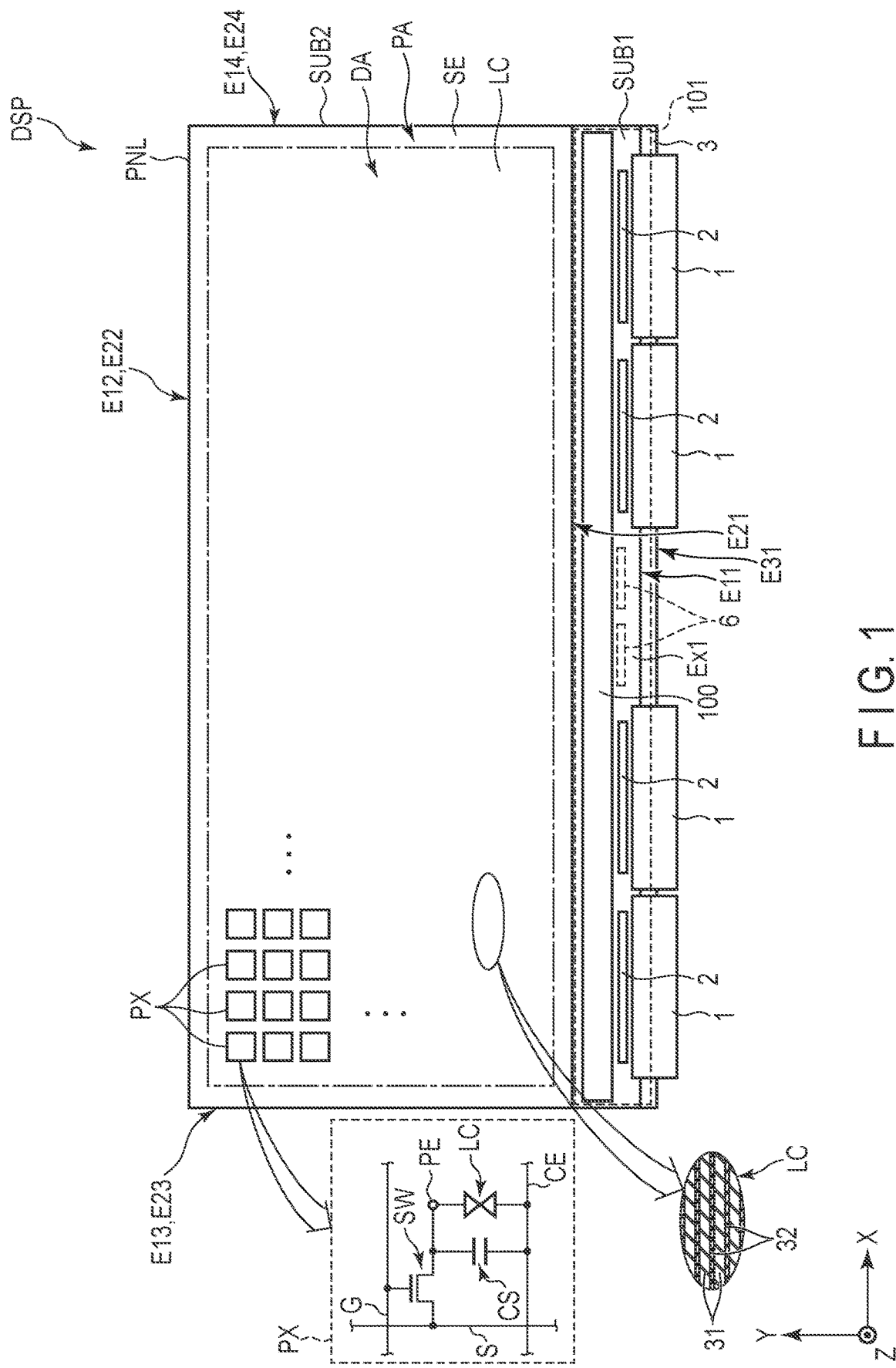
FIG. 1 is a plan view showing a configuration example of a display device according to an embodiment.

In general, according to one embodiment, a display device comprises a first substrate having a first surface, a second surface on a side opposite to the first surface, and a first side surface which connects the first surface with the second surface, a second substrate having a second side surface and opposed to the first surface, an IC chip mounted on the first substrate, and a first heat radiation layer which is in contact with the second surface to radiate heat generated from the IC chip. The first substrate includes an extending portion which includes the first side surface and extends further than the second side surface of the second substrate, the IC chip is located on the first surface at the extending portion, and the first heat radiation layer overlaps the IC chip in a thickness direction of the first substrate.

According to the above configuration, a display device capable of suppressing rise in the temperature at an IC chip can be provided.

One of embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention.

In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In the embodiment, the first direction X, second direction Y, and third direction Z are defined as shown in each figure. The first direction X, the second direction Y, and the third direction Z are orthogonal to each other, but may cross each other at an angle other than 90 degrees. In addition, the third direction Z is defined as an upper or upward direction while a direction opposite to the third direction Z is defined as a lower or downward direction, in each of the present embodiments.

Expressions such as "a second component above a first component" and "a second component beneath a first component" mean that the second component may be in contact with the first component or may be located apart from the first component. Viewing an X-Y plane defined by the first direction X and the second direction Y is hereinafter referred to as planar view.

The embodiment discloses a translucent liquid crystal display device having a visually recognizable background, to which polymer dispersed liquid crystal is applied, as an example of the display device. Incidentally, the embodiment does not prevent application of individual technical ideas disclosed in the embodiment to other types of display devices.

As the other types of display devices, for example, a transmissive liquid crystal display device that displays an image by using light of a backlight, a reflective liquid crystal display device that displays an image by using external light, a self-luminous display device comprising an organic electroluminescent display element or a light emitting diode (LED) display element, an electronic paper display device comprising an electrophoretic element, a display device to which the micro-electromechanical systems (MEMS) is applied, a display device to which the electrochromism is applied, and the like are assumed.

Figure 2:
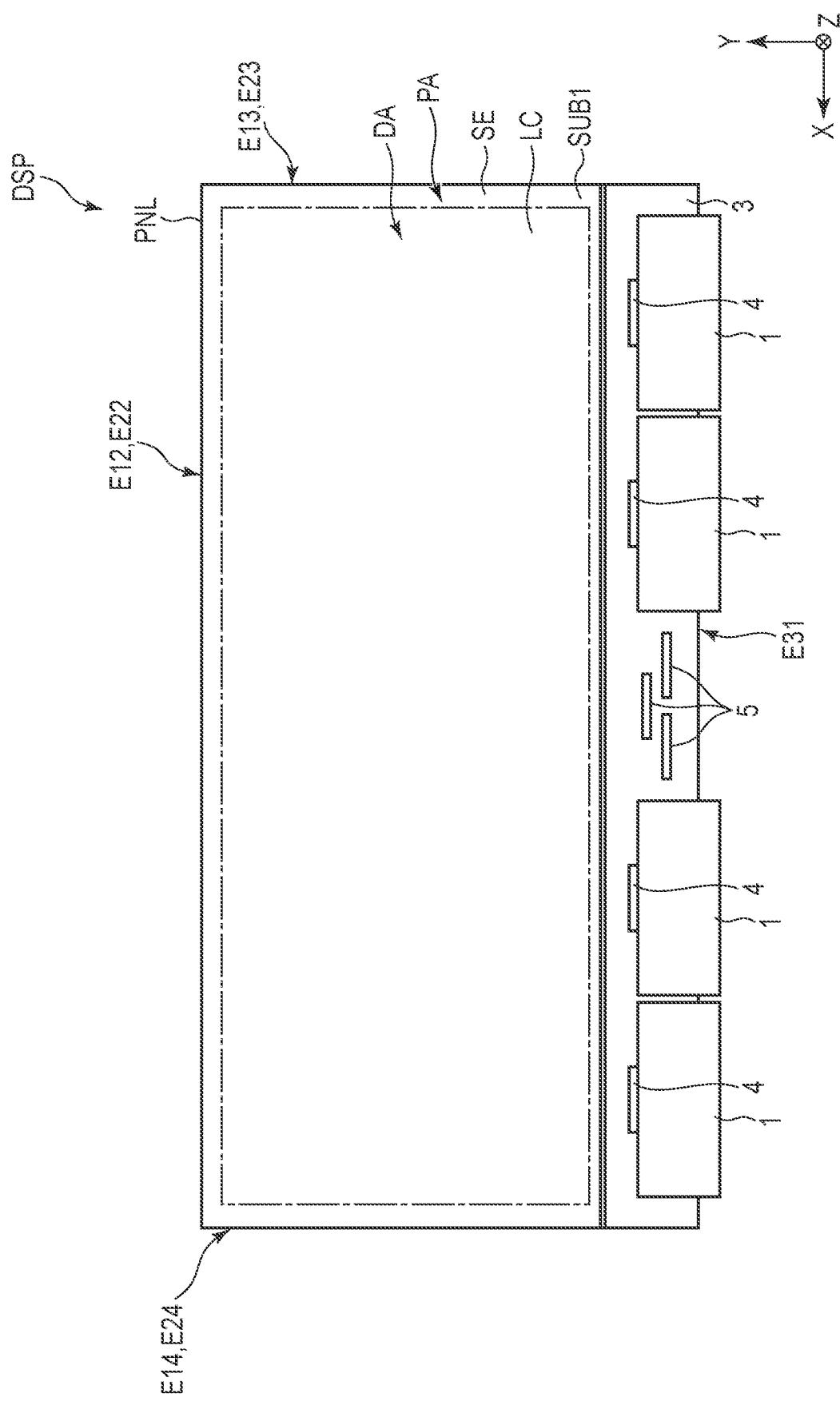
FIG. 2 is a bottom view showing a configuration example of the display device according to the embodiment.

FIG. 1 is a plan view showing a configuration example of a display device DSP according to the embodiment. FIG. 2 is a bottom view showing a configuration example of the display device DSP according to the embodiment.

As shown in FIG. 1 and FIG. 2, the display device DSP comprises a display panel PNL including a polymer dispersed liquid crystal layer (hereinafter simply referred to as a liquid crystal layer LC), a flexible wiring board 1, an IC chip 2, a first wiring board 3, and a light emitting module 100. The display device DSP further comprises a first cover member 30 and a second cover member 40, which will be described later.

The display panel PNL includes a first substrate SUB1, a second substrate SUB2, a liquid crystal layer LC, and a seal SE. The first substrate SUB1 and the second substrate SUB2 are shaped in a flat plate parallel to the X-Y plane. The first substrate SUB1 and the second substrate SUB2 overlap each other in planar view. The first substrate SUB1 and the second substrate SUB2 are bonded to each other by the seal SE. The liquid crystal layer LC is disposed between the first substrate SUB1 and the second substrate SUB2 and is sealed by the seal SE.

As enlarged and schematically shown in FIG. 1, the liquid crystal layer LC contains polymer 31 and liquid crystal molecules 32. For example, the polymer 31 is liquid crystal polymer. The polymer 31 is formed in a stripe shape extending along the first direction X and is aligned in the second direction Y.

The liquid crystal molecules 32 are dispersed in gaps of the polymer 31 and aligned such that their major axes extend in the first direction X. Each of the polymer 31 and the liquid crystal molecules 32 has optical anisotropy or refractive anisotropy. The responsiveness of the polymer 31 to the electric field is lower than that of the liquid crystal molecules 32 to the electric field.

For example, the orientation of alignment of the polymers 31 is hardly changed irrespective of the presence or absence of the electric field. In contrast, the orientation of alignment of the liquid crystal molecules 32 is changed in accordance with the electric field in a state in which a voltage higher than or equal to a threshold value is applied to the liquid crystal layer LC. In a state in which the voltage is not applied to the liquid crystal layer LC, optical axes of the polymer 31 and the liquid crystal molecules 32 are parallel to each other and the light made incident on the liquid crystal layer LC is transmitted without being substantially scattered in the liquid crystal layer LC (transmitted state). In a state in which the voltage is applied to the liquid crystal layer LC, the optical axes of the polymer 31 and the liquid crystal molecules 32 intersect each other and the light made incident on the liquid crystal layer LC is scattered in the liquid crystal layer LC (scattered state).

The display panel PNL includes a display area DA on which images are displayed and a peripheral area PA which surrounds the display area DA in a frame shape. The seal SE is disposed in the peripheral area PA. The display area DA includes pixels PX arrayed in a matrix in the first direction X and the second direction Y.

As enlarged and shown in FIG. 1, each pixel PX comprises a switching element SW, a pixel electrode PE, a common electrode CE, a liquid crystal layer LC, and the like. The switching element SW is constituted by, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y.

The pixel electrode PE is electrically connected to the switching element SW. The common electrode CE is provided commonly to the plurality of pixel electrodes PE. The liquid crystal layer LC (particularly, liquid crystal molecules LC2) is driven by an electric field produced between the pixel electrode PE and the common electrode CE. A capacitor CS is formed, for example, between for example, an electrode having the same electric potential as the common electrode CE and an electrode having the same potential as the pixel electrode PE.

The scanning line G, the signal line S, the switching element SW, and the pixel electrode PE are provided on the first substrate SUB1, and the common electrode CE is provided on the second substrate SUB2, which will be described with reference to FIG. 3. On the first substrate SUB1, the scanning line G and the signal line S are electrically connected to the flexible wiring board 1 or the IC chip 2.

The first substrate SUB1 has a pair of side surfaces E11 and E12 extending in the first direction X, and a pair of side surfaces E13 and E14 extending in the second direction Y. In the example shown in FIG. 1 and FIG. 2, the side surfaces E11 and E12 are the side surfaces formed along the longer sides, and the side surfaces E13 and E14 are the side surfaces formed along the shorter sides.

The second substrate SUB2 has a pair of side surfaces E21 and E22 extending in the first direction X, and a pair of side surfaces E23 and E24 extending in the second direction Y. In the example shown in FIG. 1 and FIG. 2, the side surfaces E21 and E22 are the side surfaces formed along the longer sides, and the side surfaces E23 and E24 are the side surfaces formed along the shorter sides.

In the example shown in FIG. 1 and FIG. 2, the side surfaces E12 and E22 overlap each other, the side surfaces E13 and E23 overlap each other, and the side surfaces E14 and E24 overlap each other, in planar view, but may not overlap.

The first substrate SUB1 includes an extending portion Ex1 which extends from the side surface E21 of the second substrate SUB2. From the other viewpoint, the extending portion Ex1 does not overlap the second substrate SUB2. The side surface E11 is included in the extending portion Ex1. The side surface E21 is located between the side surface E11 and the display area DA in planar view. Incidentally, the shape of the first substrate SUB1 and the second substrate SUB2 is not limited to a rectangular shape.

The flexible wiring board 1 and the IC chip 2 are mounted on the extending portion Ex1. Each of the flexible wiring board 1 and the IC chip 2 is aligned with the first direction X. The flexible wiring board 1 is, for example, a flexible printed circuit board and is bent toward the first wiring board 3 in the example shown in FIG. 1 and FIG. 2. The IC chip 2 incorporates, for example, a display driver which outputs a signal necessary for image display, and the like. For example, one flexible wiring board 1 is electrically connected to one IC chip 2. The flexible wiring board 1 and the IC chip 2 may read signals from the display panel PNL in some cases, but mainly function as signal sources which supply signals to the display panel PNL.

In the example shown in FIG. 1 and FIG. 2, the display device DSP comprises a plurality of (for example, four) flexible wiring boards 1, but may comprise a single flexible wiring board 1. In addition, the display device DSP comprises a plurality of (for example, four) IC chips 2 but may comprise a single IC chip 2.

The first wiring board 3 is, for example, a printed circuit board. The first wiring board 3 has more rigidity than, for example, the flexible wiring board 1. From the other viewpoint, the thickness of the first wiring board 3 is larger than, for example, the thickness of the flexible wiring board 1. In other words, the first wiring board 3 is more difficult to bend than the flexible wiring board 1. As shown in FIG. 2, the first wiring board 3 includes a connector 4. The flexible wiring board 1 is connected to the first wiring board 3 via the connector 4. From the other viewpoint, the flexible wiring board 1 electrically connects the first substrate SUB1 to the first wiring board 3.

Furthermore, the first wiring board 3 is connected to a control unit (not shown) via a connector 5. Various signals and power supply voltages output from the control unit are output to the display panel PNL via the first wiring board 3 and the flexible wiring board 1. The first wiring board 3 has a side surface E31 at a position protruding from the side surface E11 of the first substrate SUB1. The side surface E11 is located between the side surface E21 and the side surface E31 in planar view.

Details of the light emitting module 100 will be described below, and the light emitting module 100 is provided along the side surface (or the end portion) of the display panel PNL. In the example shown in FIG. 1, the light emitting module 100 is provided at the extending portion Ex1. The light emitting module 100 includes a second wiring board 101. The second wiring board 101 is electrically connected to the outside via a connector 6 for inputting various signals and power supply voltages. The first wiring board 3 and the second wiring board 101 may include portions extending from the display panel PNL in the first direction X and a direction opposite to the first direction X.

Figure 3:
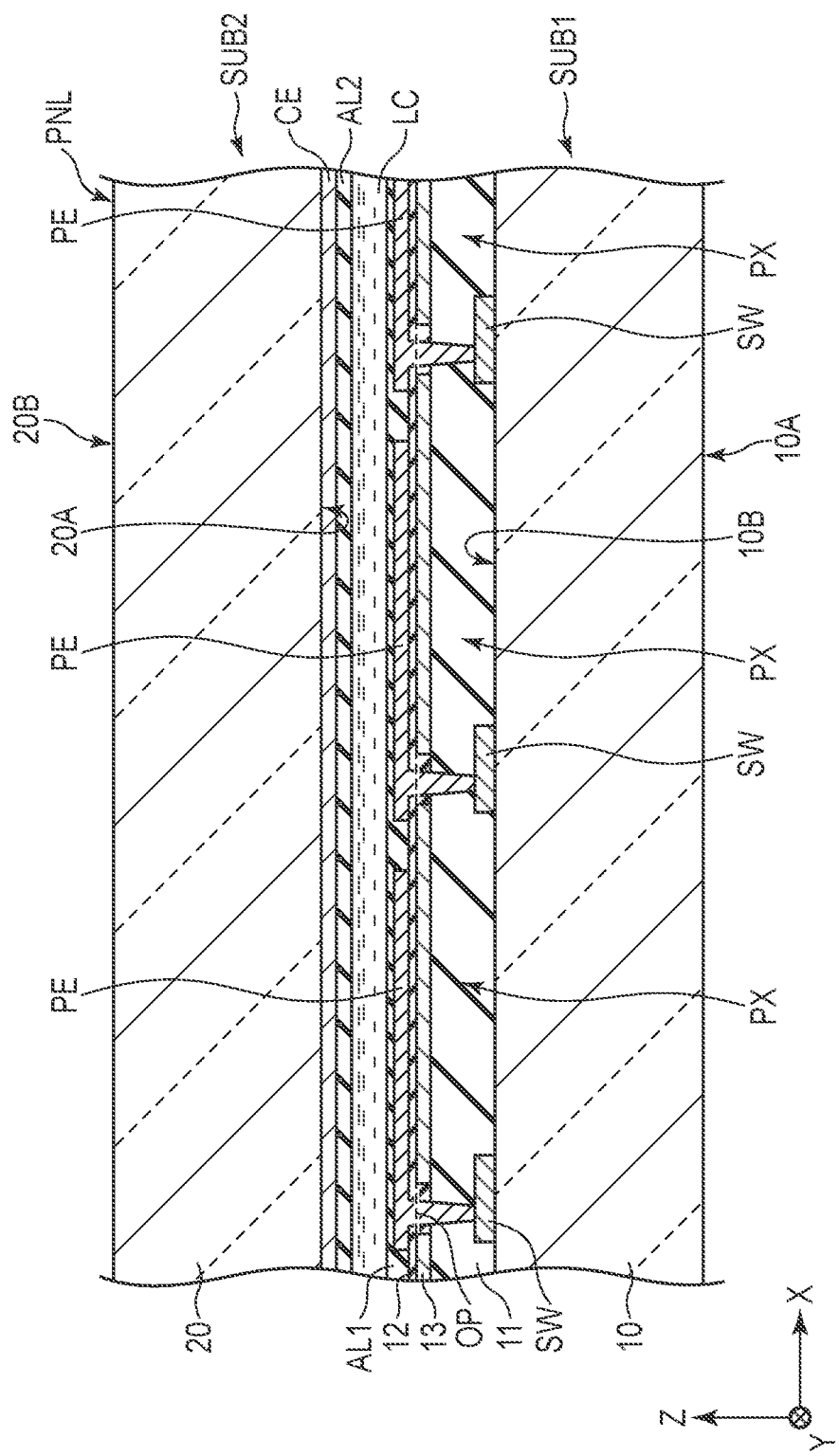
FIG. 3 is a cross-sectional view showing a configuration example of the display panel shown in FIG. 1 and FIG. 2.

FIG. 3 is a cross-sectional view showing a configuration example of the display panel PNL shown in FIG. 1 and FIG. 2. The first substrate SUB1 includes a transparent substrate 10, insulating films 11 and 12, a capacitive electrode 13, switching elements SW, the pixel electrodes PE, and an alignment film AL1. The transparent substrate 10 has a main surface 10A (second surface) and a main surface 10B (first surface) on a side opposite to the main surface 10A.

The switching elements SW are provided on the main surface 10B side. The insulating film 11 is provided on the main surface 10B to cover the switching elements SW. Incidentally, the scanning lines G and the signal lines S shown in FIG. 1 are provided between the transparent substrate 10 and the insulating film 11 but their illustration is omitted here. The capacitive electrode 13 is provided between the insulating films 11 and 12.

The pixel electrode PE is provided between the insulating film 12 and the alignment film AL1, in each pixel PX. In other words, the capacitive electrode 13 is provided between the transparent substrate 10 and pixel electrodes PE. The pixel electrodes PE are electrically connected to the switching elements SW through opening portions OP of the capacitive electrode 13. The pixel electrodes PE overlap the capacitive electrode 13 with the insulating film 12 sandwiched therebetween, to form capacitors CS of the pixels PX. The alignment film AL1 covers the pixel electrodes PE.

The second substrate SUB2 is opposed to the first substrate SUB1. The second substrate SUB2 includes a transparent substrate 20, the common electrode CE, and an alignment film AL2. The transparent substrate 20 has a main surface 20A and a main surface 20B on a side opposite to the main surface 20A. The main surface 20A of the transparent substrate 20 faces the main surface 10B of the transparent substrate 10.

The common electrode CE is provided on the main surface 20A. The alignment film AL2 covers the common electrode CE. The liquid crystal layer LC is located between the main surface 10B and the main surface 20A and is in contact with the alignment films AL1 and AL2. In the second substrate SUB2, a light-shielding layer may be provided just above each of the switching elements SW, the scanning lines G, and the signal lines S. Alternatively, a transparent insulating film may be provided between the transparent substrate 20 and the common electrode CE or between the common electrode CE and the alignment film AL2.

The common electrode CE is disposed across a plurality of pixels PX and opposed to the plurality of pixel electrodes PE in the third direction Z. The common electrode CE has the same potential as the capacitive electrode 13. The liquid crystal layer LC is located between the pixel electrodes PE and the common electrode CE.

For example, the transparent substrate 10 corresponds to a base material of the first substrate SUB1, and the transparent substrate 20 corresponds to a base material of the second substrate SUB2. The transparent substrates 10 and 20 are, for example, glass substrates, but may be insulating substrates such as plastic substrates. The insulating film 11 includes, for example, a transparent inorganic insulating film of silicon oxide, silicon nitride, silicon oxynitride or the like, and a transparent organic insulating film of acrylic resin or the like. The insulating film 12 is, for example, a transparent inorganic insulating film of silicon nitride or the like. The capacitive electrode 13, the pixel electrodes PE, and the common electrode CE are transparent electrodes formed of, for example, a transparent conductive material such as indium tin oxide (ITO) or indium zinc oxide (IZO).

Figure 4:
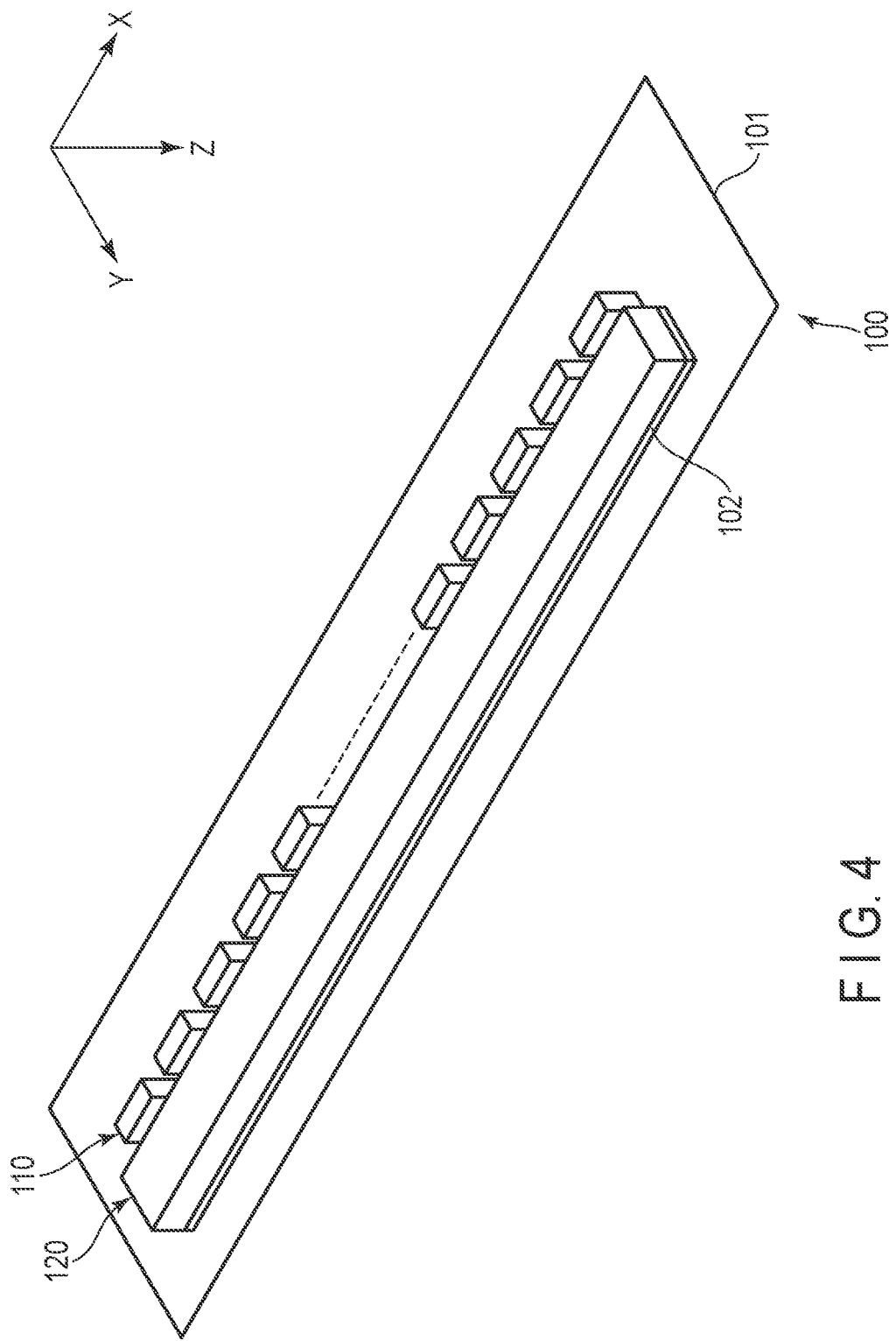
FIG. 4 is a perspective view showing a configuration example of a light emitting module shown in FIG. 1.

FIG. 4 is a perspective view showing a configuration example of the light emitting module 100 shown in FIG. 1. The light emitting module 100 includes a second wiring board 101, an adhesive layer 102, a plurality of light sources 110, and a light guide (for example, prism lens) 120. The plurality of light sources 110 are mounted on the second wiring board 101.

The plurality of light sources 110 are opposed to the light guide 120 in the second direction Y. The plurality of light sources 110 are spaced apart with intervals along the first direction X and electrically connected to the second wiring board 101.

In the light sources 110, red LEDs, green LEDs, and blue LEDs are continuously aligned. Alternatively, the light sources 110 are not limited to an arrangement in which LEDs of three different colors are continuously aligned, but, for example, only white light sources emitting white light may be continuously aligned.

The light guide 120 is formed of, for example, resin and shaped in a transparent rod, and extends along the first direction X. The light guide 120 has, for example, a plurality of curved surfaces corresponding to the respective light sources 110, to control the width in the first direction X of the light irradiated from the light sources 110. The light guide 120 is bonded to the second wiring board 101 by the adhesive layer 102. The light guide 120 may be constituted by a plurality of light guides. The number of light sources 110 and light guides 120 in the light emitting module 100 is not limited to the illustrated example.

FIG. 5 is a cross-sectional view showing a configuration example of the display device DSP according to the embodiment. FIG. 6 is a plan view showing parts of the display device DSP shown in FIG. 5. In FIG. 6, the extending portion Ex1 and the like are mainly illustrated, but illustration of the light emitting module 100 is omitted.

As described above, the display device DSP comprises the display panel PNL, the flexible wiring board 1, the IC chip 2, the first wiring board 3, and the light emitting module 100. The only main parts of the display panel PNL are simply illustrated.

The display device DSP further comprises an adhesive layer AD1 bonding the first cover member 30, the second cover member 40, the second substrate SUB2 and the first cover member 30, and an adhesive layer AD2 bonding the first substrate SUB1 and the second cover member 40. In the example shown in FIG. 5, the first cover member 30 and the second cover member 40 overlap the display area DA in the third direction Z, but do not overlap the extending portion Ex1. The first wiring board 3 overlaps the extending portion Ex1 in the third direction Z, but does not overlap the display area DA.

As described with reference to FIG. 1, the transparent substrate 10 has the side surface E11 (first side surface), in the first substrate SUB1. The side surface E11 connects the main surface 10A with the main surface 10B. In the second substrate SUB2, the transparent substrate 20 has the side surface E21 (second side surface). The side surface E21 connects the main surface 20A with the main surface 20B. The side surface E11 protrudes from the side surface E21 of the transparent substrate 20 in the direction opposite to the second direction Y. The side surfaces E11 and E21 are the surfaces substantially parallel to an X-Z plane defined by the first direction X and the third direction Z.

The first cover member 30 has a main surface 30A, a main surface 30B on the side opposite to the main surface 30A, and a side surface 30C that connects the main surface 30A with the main surface 30B. The main surfaces 30A and 30B are the surfaces substantially parallel to the X-Y plane. The main surface 30A is opposed to the main surface 20B of the transparent substrate 20. The side surface 30C is the surface substantially parallel to the X-Z plane. The side surface 30C is located on the light emitting module 100 side in the second direction Y. In the example shown in FIG. 5, the side surface 30C is located directly above the side surface E21, but may be shifted in the direction Y.

The second cover member 40 has a main surface 40A, a main surface 40B on the side opposite to the main surface 40A, and a side surface 40C that connects the main surface 40A with the main surface 40B. The main surfaces 40A and 40B are the surfaces substantially parallel to the X-Y plane. The main surface 40B is opposed to the main surface 10A of the transparent substrate 10. The side surface 40C is the surface substantially parallel to the X-Z plane. The side surface 40C is located on the light emitting module 100 side in the second direction Y. The side surface 40C is opposed to the first wiring board 3.

The side surface 40C is located on the display area DA side with respect to the side surface 30C in the second direction Y. In the example shown in FIG. 5, the side surface 40C is not located directly under the side surface 300 in the third direction Z, but overlaps the peripheral area PA1 between the side surface E21 (side surface 30C) and the display area DA. From the other viewpoint, the side surface 40C is located between the side surface 30C and the display area DA in the second direction Y. In the example shown in FIG. 5, the side surface 40C is separated from the side surface 30C at a distance L1 in the second direction Y. In contrast, in the example shown in FIG. 5, the side surface on the side opposite to the side surface 40C in the second cover member 40 is located directly below the side surface opposite to the side surface 30C.

The adhesive layer AD1 bonds the main surface 20B of the transparent substrate 20 to the main surface 30A of the first cover member 30. The adhesive layer AD1 includes an end portion AD1a on the side surface 30C side in the second direction Y. The adhesive layer AD1 is not formed directly below the side surface 30C, but may be formed directly below the side surface 30C.

The adhesive layer AD2 bonds the main surface 10A of the transparent substrate 10 to the main surface 40B of the second cover member 40. The adhesive layer AD2 includes an end portion AD2a on the side surface 40C side in the second direction Y. The adhesive layer AD2 is not formed directly above the side surface 40C, but may be formed directly above the side surface 40C.

The adhesive layers AD1 and AD2 overlap the display area DA in the third direction Z. From the other viewpoint, the liquid crystal layer LC in the display area DA is located between the adhesive layers AD1 and AD2 in the third direction Z. The adhesive layers AD1 and AD2 can block, for example, most of ultraviolet rays. Blocking includes reflecting and absorbing ultraviolet rays, and the like. An influence of the ultraviolet rays included in the external light to the liquid crystal layer LC can be suppressed by forming the adhesive layers AD1 and AD2 so as to cover the display area DA.

The end portions AD1a and AD2a overlap the peripheral area PA1 in the third direction Z. The end portion AD2a is located on the display area DA side with respect to the end portion AD1a. In the example shown in FIG. 5, the end portion AD2a is located between the end portion AD1a and the display area DA, and between the side surface 40C and the display area DA, in the second direction Y. The adhesive layers AD1 and AD2 are formed of, for example, optical clear adhesive (OCA) or the like.

In the example shown in FIG. 5, each of the transparent substrate 10, the transparent substrate 20, the first cover member 30, and the second cover member 40 has a substantially equal thickness along the third direction Z. The first cover member 30 and the second cover member 40 are, for example, glass substrates, but may also be insulating substrates such as plastic substrates.

The light emitting module 100 overlaps the extending portion Ex1 in the third direction Z. The second wiring board 101 has a main surface 101A opposed to the main surface 10B of the transparent substrate 10, at the extending portion Ex1. The light source 110 is mounted on the main surface 101A side.

The light source 110 and the light guide 120 are provided between the extending portion Ex1 and the second wiring board 101, in the third direction Z. In the example shown in FIG. 5, the light source 110 and the light guide 120 are provided along the side surface E21. The light guide 120 is located between the light sources 110 and the side surface E21, and between the light sources 110 and the side surface 30C, in the second direction Y.

The light guide 120 is bonded to the second wiring board 101 by the adhesive layer 102 and is bonded to the extending portion Ex1 by the adhesive layer 103. The adhesive layers 102 and 103 are formed by, for example, double-sided tapes or the like. Each of the adhesive layers 102 and 103 is constituted by, for example, a reflective layer and adhesive layers formed on both sides of the reflective layer.

Next, light emitted from the light source 110 will be described. The light source 110 emits light toward at least one of the side surface 30C and the side surface E21. In the example shown in FIG. 5, the light source 110 emits light toward the side surface 30C and the side surface E21. The light emitted from the light source 110 is moderately diffused in the light guide 120, made incident on the transparent substrate 20 from the side surface E21, and made incident on the first cover member 30 from the side surface 30C.

The light made incident on the transparent substrate 20 and the first cover member 30 propagates through the interior of the display panel PNL while repeatedly reflected. The light made incident on the liquid crystal layer LC to which no voltage is applied is transmitted through the liquid crystal layer LC while hardly scattered.

In addition, the light made incident on the liquid crystal layer LC to which the voltage is applied is scattered in the liquid crystal layer LC. The display device DSP allows images to be observed from the main surface 30B side and also allows images to be observed from the main surface 40A side. In addition, even when the display device DSP is observed from the main surface 30B side or observed from the main surface 40A side, a background of the display device DSP can be observed via the display device DSP.

The first wiring board 3 has a main surface 3B opposed to the main surface 10A, a main surface 3A on a side opposite to the main surface 3B, and a pair of side surfaces E31 and E32. The connector 4 to which the flexible wiring board 1 is connected is provided on the main surface 3A. The main surfaces 3A and 3B are the surfaces substantially parallel to the X-Y plane. The pair of side surfaces E31 and E32 are the surfaces substantially parallel to the X-Z plane. The pair of side surfaces E31 and E32 connect the main surface 3A with the main surface 3B.

In the example shown in FIG. 5, the connector 4 is located on the side surface E32 side with respect to a central part of the main surface 3A of the wiring board 3 in the second direction Y. The connector 4 overlaps the light guide 120 in, for example, the third direction Z. However, the position of the connector 4 on the main surface 3A is not limited to the example shown in the figure.

The first wiring board 3 protrudes from the side surface E11 of the transparent substrate 10. From the other viewpoint, the side surface E31 protrudes from the side surface E11 of the transparent substrate 10 in the direction opposite to the second direction Y. The side surface E32 is located on the side opposite to the side surface E31 and opposed to the side surface 40C of the second cover member 40. The first wiring board 3 is aligned with the second cover member 40 in the second direction Y, and located on the left side of the second cover member 40 in the example shown in FIG. 5.

The side surface E32 of the first wiring board 3 overlaps the peripheral area PA1 in the third direction Z. From the other viewpoint, the side surface E32 is located between the side surface 40C and the side surface 30C in the second direction Y. In the example shown in FIG. 5, the first wiring board 3 overlaps not only the transparent substrate 10, but also the first cover member 30 and the transparent substrate 20, in the third direction Z.

In the example shown in FIG. 5, the IC chip 2 is located on the main surface 10B at the extending portion Ex1. The IC chip 2 has an upper surface 2B located on a side opposite to the surface opposed to the main surface 10A of the transparent substrate 10. The upper surface 2B is opposed to a main surface 101A of the second wiring board 101. The display device DSP further comprises a first heat radiation layer HR1 and a second heat radiation layer HR2. Each of the first heat radiation layer HR1 and the second heat radiation layer HR2 mainly radiates heat generated from the IC chip 2.

The first heat radiation layer HR1 is located between the main surface 10A of the transparent substrate 10 and the main surface 3B of the first wiring board 3, and is in contact with each of the main surface 10A and the main surface 3B in the example shown in FIG. 5. The first heat radiation layer HR1 overlaps the IC chip 2 in a thickness direction (third direction Z) of the first substrate SUB1.

The second heat radiation layer HR2 is located between the upper surface 2B of the IC chip 2 and the main surface 101A of the second wiring board 101, and is in contact with each of the upper surface 2B and the main surface 101A in the example shown in FIG. 5. The second heat radiation layer HR2 overlaps the IC chip 2 in the third direction Z. A thickness of the second heat radiation layer HR2 in the third direction Z is larger than, for example, a thickness of the first heat radiation layer HR1 in the third direction Z.

In FIG. 6, the main surface 10B side of the transparent substrate 10 is viewed from a direction perpendicular to the extending portion Ex1 of the first substrate SUB1. In the example shown in FIG. 6, the first heat radiation layer HR1 is represented by hatch lines, and the second heat radiation layer HR2 is represented by dots. For example, the area of the first heat radiation layer HR1 is larger than the area of the IC chips 2 in planar view. From the other viewpoint, the first heat radiation layer HR1 is formed on the main surface 10A side of the transparent substrate 10 to cover the IC chips 2.

In the examples shown in FIG. 5 and FIG. 6, a width W1 of the first heat radiation layer HR1 in the second direction Y is larger than a width W10 of the IC chip 2 in the second direction Y, and a width of the first heat radiation layer HR1 in the first direction X is substantially equal to a width of the transparent substrate 10 in the first direction X. The IC chip 2 is located within a range of the width W1 of the first heat radiation layer HR1 in the second direction Y. As shown in FIG. 6, for example, the area of the first heat radiation layer HR1 is larger than the total area of four IC chips 2 in planar view.

The area of the second heat radiation layer HR2 is substantially equal to the area of the IC chips 2 in planar view. In the examples shown in FIG. 5 and FIG. 6, a width W2 of the second heat radiation layer HR2 in the second direction Y is substantially equal to the width W10 of the IC chip 2 in the second direction Y, and the width of the second heat radiation layer HR2 in the first direction X is substantially equal to the width of the IC chip 2 in the first direction X. From the other viewpoint, the second heat radiation layer HR2 is substantially equal to the IC chips 2 in planar view, and is in contact with the entire upper surface 2B.

The first heat radiation layer HR1 is, for example, an adhesive material, and bonds the main surface 10A of the transparent substrate 10 to the main surface 3B of the first wiring board 3. The second heat radiation layer HR2 is, for example, an adhesive material, and bonds the upper surface 2B of the IC chip 2 to the main surface 101A of the second wiring board 101.

When the first heat radiation layer HR1 is an adhesive material, a gap can hardly be formed between the main surface 10A and the first heat radiation layer HR1 and between the first heat radiation layer HR1 and the main surface 3B. When the second heat radiation layer HR2 is an adhesive material, a gap can hardly be formed between the upper surface 2B and the second heat radiation layer HR2 and between the second heat radiation layer HR2 and the main surface 101A.

The heat generated from the IC chip 2 in accordance with drive of the display device DSP is transmitted to the surrounding of the IC chip 2 as represented by, for example, arrows shown in FIG. 5. The heat generated from the IC chip 2 is transmitted to the first heat radiation layer HR1 via the transparent substrate 10 in the direction opposite to the third direction Z. When the heat is transmitted to the first heat radiation layer HR1, the heat is scattered to the first heat radiation layer HR1 and is radiated from the first heat radiation layer HR1 to the first wiring board 3 and the outside.

Since the first heat radiation layer HR1 is provided to overlap the IC chip 2 in the third direction Z, the heat transmitted from the IC chip 2 to the transparent substrate 10 can be efficiently transmitted to the first heat radiation layer HR1. In contrast, since a gap is formed between the first wiring board 3 and the second cover member 40, the heat transmitted to the first wiring board 3 can hardly be transmitted to the second cover member 40.

Part of the heat generated from the IC chip 2 is transmitted to the second heat radiation layer HR2 in the third direction Z. When the heat is transmitted to the second heat radiation layer HR2, the heat is scattered to the second heat radiation layer HR2 and is radiated from the second heat radiation layer HR2 to the second wiring board 101 and the outside.

The first heat radiation layer HR1 and the second heat radiation layer HR2 are formed with, for example, double-sided tapes excellent in thermal conduction. In this case, each of the first heat radiation layer HR1 and the second heat radiation layer HR2 includes an adhesive layer (not shown). The first heat radiation layer HR1 and the second heat radiation layer HR2 are formed of, for example, materials having a high thermal conductivity such as graphite sheets. The first heat radiation layer HR1 and the second heat radiation layer HR2 may be formed of, for example, silicon-based or acrylic-based resin materials or the like.

The first heat radiation layer HR1 and the second heat radiation layer HR2 may be formed of the same material or different materials. For example, the second heat radiation layer HR2 may be formed with a double-sided tape thicker than the first heat radiation layer HR1 or may be formed by stacking two or more double-sided tapes used to form the first heat radiation layer HR1.

The thermal conductivity of the first heat radiation layer HR1 is desirably higher than that of the base material of the first substrate SUB1. More specifically, the first heat radiation layer HR1 is desirably higher than that of the transparent substrate 10 corresponding to the base material of the first substrate SUB1. The heat of the transparent substrate 10 can be thereby transmitted efficiently to the first heat radiation layer HR1.

Furthermore, when the first heat radiation layer HR1 is an adhesive material, the heat of the transparent substrate 10 can be efficiently transmitted to the first heat radiation layer HR1 by bringing the first heat radiation layer HR1 into close contact with the main surface 10A. When the second heat radiation layer HR2 is an adhesive material, the heat of the transparent substrate 10 can be efficiently transmitted to the second heat radiation layer HR2 by bringing the second heat radiation layer HR2 into close contact with the upper surface 2B.

The first heat radiation layer HR1 is not formed directly above the side surface E32 of the first wiring board 3, but may be formed at a position where it overlaps the light guide 120 in the third direction Z or formed directly above the side surface E32. For example, the area of the first heat radiation layer HR1 may be substantially equal to the area of the extending portion Ex1 in planar view.

The flexible wiring board 1 includes a first end portion 1a and a second end portion 1b on a side opposite to the first end portion 1a. The first end portion 1a is connected to the extending portion Ex1 of the first substrate SUB1, and the second end portion 1b is connected to the connector 4 provided on the first wiring board 3.

The flexible wiring board 1 further includes a first bend portion 1A, a thick portion 1B, a second bend portion 1C, a first portion 1D, a third bend portion 1E, and a second portion 1F, from the first end portion 1a side, between the first end portion 1a and the second end portion 1b. The flexible wiring board 1 is bent to the side of the main surface 10A of the transparent substrate 10 to straddle the first wiring board 3 by the first bend portion 1A. The extending portion Ex1 and the first wiring board 3 are located between the parts of the flexible wiring board 1 in the third direction Z.

The thick portion 1B is located between the first bend portion 1A and the second end portion 1b. The thick portion 1B overlaps the first wiring board 3 in the third direction Z. A thickness D2 of the thick portion 1B is larger than, for example, a thickness D1 of portions (first bend portion 1A, second bend portion 1C, first portion 1D, third bend portion 1E, and second portion 1F) other than the thick portion 1B (D2>D1).

From the other viewpoint, the thick portion 1B has more rigidity and is more difficult to bend than the portions other than the thick portion 1B. The thick portion 1B is formed by disposing lines on both sides of a base material formed of, for example, polyimide or the like. For example, a width of the thick portion 1B in the first direction X is substantially equal to a width of the first bend portion 1A in the first direction X, and is smaller than widths of the second bend portion 1C, the first portion 1D, the third bend portion 1E, and the second portion 1F in the first direction X.

The second bend portion 1C is located between the thick portion 1B and the second end portion 1b, and the first portion 1D is located between the second bend portion 1C and the second end portion 1b. The third bend portion 1E is located between the first portion 1D and the second end portion 1b, and the second portion 1F is located between the third bend portion 1E and the second end portion 1b. The second bend portion 1C is located on the display area DA side with respect to the first bend portion 1A in the second direction Y. The third bend portion 1E is located between the first bend portion 1A and the second bend portion 1C in the second direction Y.

The flexible wiring board 1 is bent by the second bend portion 1C, and the first portion 1D is located between the thick portion 1B and the first wiring board 3 in the third direction Z. Furthermore, the flexible wiring board 1 is bent by the third bend portion 1E, and the second portion 1F is located between the first portion 1D and the first wiring board 3 in the third direction Z. The flexible wiring board 1 is bent in an S-letter shape in cross-sectional view of viewing the Y-Z plane defined by the second direction Y and the third direction Z.

The display device DSP further comprises an adhesive layer 7A bonding the thick portion 1B to the first portion 1D, and an adhesive layer 7B bonding the first portion 1D to the second portion 1F. The adhesive layers 7A and 7B are formed with, for example, double-sided tapes or the like. The thick portion 1B, the adhesive layer 7A, the first portion 1D, the adhesive layer 7B, and the second portion 1F are arranged in this order along the third direction Z, under the first wiring board 3.

In the example shown in FIG. 5, widths of the adhesive layers 7A and 7B in the second direction Y are substantially equal to each other, but the width of the adhesive layer 7A in the second direction Y may be larger than the width of the adhesive layer 7B in the second direction Y or the width of the adhesive layer 7A in the second direction Y may be smaller than the width of the adhesive layer 7B in the second direction Y.

In the example shown in FIG. 5, widths of the adhesive layers 7A and 7B in the third direction Z are substantially equal to each other, but the width of the adhesive layer 7A in the third direction Z may be larger than the width of the adhesive layer 7B in the third direction Z or the width of the adhesive layer 7A in the third direction Z may be smaller than the width of the adhesive layer 7B in the third direction Z. The adhesive layer 7A overlaps the adhesive layer 7B in the third direction Z, but may not overlap the adhesive layer 7B and may be shifted in the second direction Y.

The adhesive layers 7A and 7B suppress spreading of the flexible wiring board 1 in the third direction Z. In the example shown in FIG. 5, the adhesive layers 7A and 7B are provided, but the only adhesive layer 7A may be provided between the thick portion 1B and the first portion 1D, the only adhesive layer 7B may be provided between the first portion 1D and the second portion 1F, or none of the adhesive layers 7A and 7B may be provided.

As described above, according to the embodiment, the display device DSP capable of suppressing the rise in temperature of the IC chip 2 can be provided. In other words, the rise in temperature of the IC chip 2 can be suppressed by transmitting the heat generated from the IC chip 2 to the first heat radiation layer HR1 and the second heat radiation layer HR2. It is possible to prevent operation failure, deformation, and the like of the IC chip 2, the first substrate SUB1, and the like and improve the reliability of the display device DSP by suppressing the rise in temperature.

It is possible to radiate heat by the first heat radiation layer HR1 in a range wider than the area of the IC chip 2 by effectively using the main surface 10A of the transparent substrate 10 and making the area of the first heat radiation layer HR1 larger than the area of the IC chip 2 in planar view. It is possible to transmit the heat of the IC chip 2 not to the first wiring board 3, but to the second wiring board 101 and further suppress the rise in temperature of the IC chip 2 by providing not only the first heat radiation layer HR1, but also the second heat radiation layer HR2 in the display device DSP.

For example, bonding the transparent substrate 10 to the first wiring board 3 by the first heat radiation layer HR1 can contribute to suppression in the manufacturing costs and the like as compared with providing the adhesive material other than the first heat radiation layer HR1. Moreover, the above-described various advantages can be obtained from the embodiment.

The shape and the area of the first heat radiation layer HR1 and the second heat radiation layer HR2 can be changed as appropriate in consideration of the heat radiation effect. The thickness of each of the first heat radiation layer HR1 and the second heat radiation layer HR2 in the third direction Z can be changed as appropriate. For example, the thickness of the second heat radiation layer HR2 in the third direction Z may be substantially equal to the thickness of the first heat radiation layer HR1 in the third direction Z. For example, the area of the second heat radiation layer HR2 may be larger or smaller than the area of the IC chips 2 in planar view. The second heat radiation layer HR2 can exert the heat radiation effect even when the second heat radiation layer HR2 is in contact with not only the upper surface 2B of the IC chip 2, but also, for example, the side surface of the IC chip 2 or the like. The first heat radiation layer HR1 and the second heat radiation layer HR2 may be formed with not only double-sided tapes, but also adhesives excellent in thermal conduction or the like.

In the embodiment, each of the first heat radiation layer HR1 and the second heat radiation layer HR2 is provided, but the only first heat radiation layer HR1 may be provided between the transparent substrate 10 and the first wiring board 3 or the only second heat radiation layer HR2 may be provided between the IC chip 2 and the second wiring board 101. A gap may be formed between the second heat radiation layer HR2 and the second wiring board 101.

The flexible wiring board 1 includes the second bend portion 1C and the third bend portion 1E between the thick portion 1B and the second end portion 1b, but may include only one bend portion or three or more bend portions between the thick portion 1B and the second end portion 1b. The display device DSP may further comprise an adhesive layer bonding the second portion 1F to the main surface 3A of the first wiring board 3.

All of the display devices that can be implemented by a person of ordinary skill in the art through arbitrary design changes to the display devices described above as embodiments of the present invention come within the scope of the present invention as long as they are in keeping with the spirit of the present invention. Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
 a first substrate having a first surface, a second surface on a side opposite to the first surface, and a first side surface which connects the first surface with the second surface;
 a second substrate having a second side surface and opposed to the first surface;
 an IC chip mounted on the first substrate;
 a first heat radiation layer which is in contact with the second surface to radiate heat generated from the IC chip;
 a second heat radiation layer which is in contact with the IC chip; and
 a light emitting module,
 the first substrate including an extending portion which includes the first side surface and extends further than the second side surface of the second substrate,
 the IC chip being located on the first surface at the extending portion,
 the light emitting module including a wiring board opposed to the extending portion and a light source mounted on the wiring board, and
 the first heat radiation layer, the extending portion, the IC chip, the second heat radiation layer, and the wiring board being arranged in this order in a thickness direction of the first substrate.

2. The display device of claim 1, wherein
a thickness of the second heat radiation layer is larger than a thickness of the first heat radiation layer.

3. The display device of claim 1, wherein
the second heat radiation layer is in contact with the wiring board.

4. The display device of claim 3, wherein
the second heat radiation layer is an adhesive material which bonds the IC chip to the wiring board.

5. The display device of claim 1, wherein
the second heat radiation layer, the light source, and the second substrate are arranged in this order in a direction orthogonal to the thickness direction.

6. The display device of claim 1, wherein
a size of the first heat radiation layer is greater than a size of the second heat radiation layer in plan view.

7. The display device of claim 6, wherein
the size of the second heat radiation layer is equivalent to a size of the IC chip in plan view.

* * * * *